United States Patent
Hofmann et al.

(10) Patent No.: US 9,915,287 B2
(45) Date of Patent: Mar. 13, 2018

(54) METHOD FOR MEASURING A PRELOADING FORCE AND BEARING ASSEMBLY FOR PERFORMING THE METHOD

(71) Applicant: Schaeffler Technologies AG & Co. KG, Herzoenaurach (DE)

(72) Inventors: Alexander Hofmann, Erlangen (DE); Rainer Gebauer, Bamberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 59 days.

(21) Appl. No.: 14/913,535

(22) PCT Filed: Aug. 20, 2014

(86) PCT No.: PCT/DE2014/200414
§ 371 (c)(1),
(2) Date: Feb. 22, 2016

(87) PCT Pub. No.: WO2015/062593
PCT Pub. Date: May 7, 2015

(65) Prior Publication Data
US 2016/0215816 A1     Jul. 28, 2016

(30) Foreign Application Priority Data
Oct. 29, 2013 (DE) ........................ 10 2013 221 942

(51) Int. Cl.
*F16C 41/00* (2006.01)
*F16C 19/52* (2006.01)
*F16C 33/58* (2006.01)

(52) U.S. Cl.
CPC .......... *F16C 19/522* (2013.01); *F16C 33/585* (2013.01); *F16C 41/00* (2013.01);
(Continued)

(58) Field of Classification Search
CPC ...... F16C 19/522; F16C 41/00; F16C 41/007; F16C 41/008; G01L 5/0019; G01M 13/04
See application file for complete search history.

(56) References Cited

U.S. PATENT DOCUMENTS

2003/0164050 A1    9/2003  Chinitz et al.
2004/0261543 A1    12/2004 Van Leeuwen et al.
(Continued)

FOREIGN PATENT DOCUMENTS

CN    1488072 A    4/2004
CN    103038618 A  4/2013
(Continued)

*Primary Examiner* — Phillip A Johnson
(74) *Attorney, Agent, or Firm* — Volpe and Koenig, P.C.

(57) ABSTRACT

A method for determining at least one preloading force (K) acting between a carrying body (7) and a rolling-element bearing (2) of a bearing assembly (1), which rolling-element bearing is mounted on the carrying body, and the bearing assembly includes the rolling-element bearing and the at least one sensor device (3). The sensor device is arranged in or on the rolling-element bearing in an installation position (E1) and is coupled to an evaluating device (10) in a signaling manner. The sensor device senses the preloading force, produces at least one signal (S) in accordance with the preloading force, and transmits the signal to the evaluating device, and the evaluating device evaluates the signal in order to measure the preloading force and the sensor device is permanently decoupled from the evaluating device after the evaluation of the signal.

11 Claims, 3 Drawing Sheets

(52) U.S. Cl.
CPC .......... *F16C 41/007* (2013.01); *F16C 41/008* (2013.01); *F16C 2208/34* (2013.01); *F16C 2229/00* (2013.01); *F16C 2240/14* (2013.01)

(56) References Cited

U.S. PATENT DOCUMENTS

| | | | | |
|---|---|---|---|---|
| 2006/0045400 | A1* | 3/2006 | Yamamoto | B60B 27/00 384/448 |
| 2009/0120184 | A1* | 5/2009 | Ozaki | B60B 27/0005 73/494 |
| 2010/0129017 | A1* | 5/2010 | Isobe | B60B 27/0005 384/448 |
| 2013/0211742 | A1 | 8/2013 | Mol | |

FOREIGN PATENT DOCUMENTS

| | | | |
|---|---|---|---|
| DE | 4218949 | 12/1994 | |
| EP | 0534537 | 3/1993 | |
| JP | 2008303892 A * | 12/2008 | ............ F16C 19/522 |
| WO | 03019126 | 3/2003 | |
| WO | WO 2007105655 A1 * | 9/2007 | ......... B60B 27/0068 |

\* cited by examiner

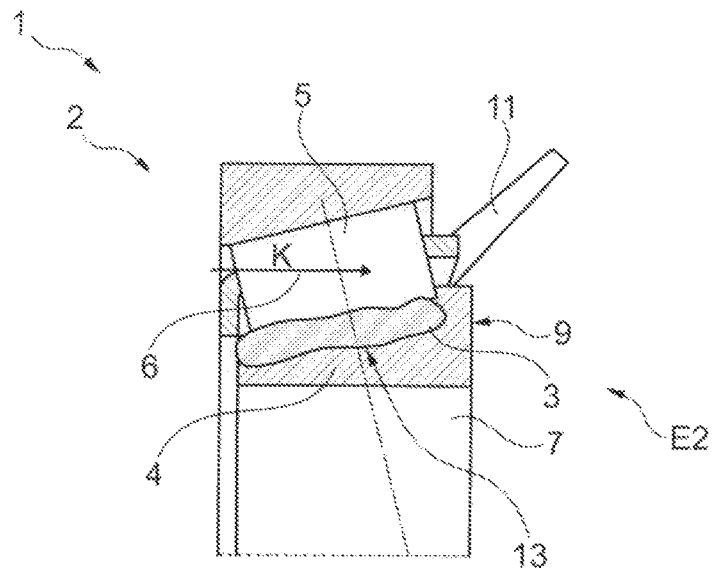
Fig. 4
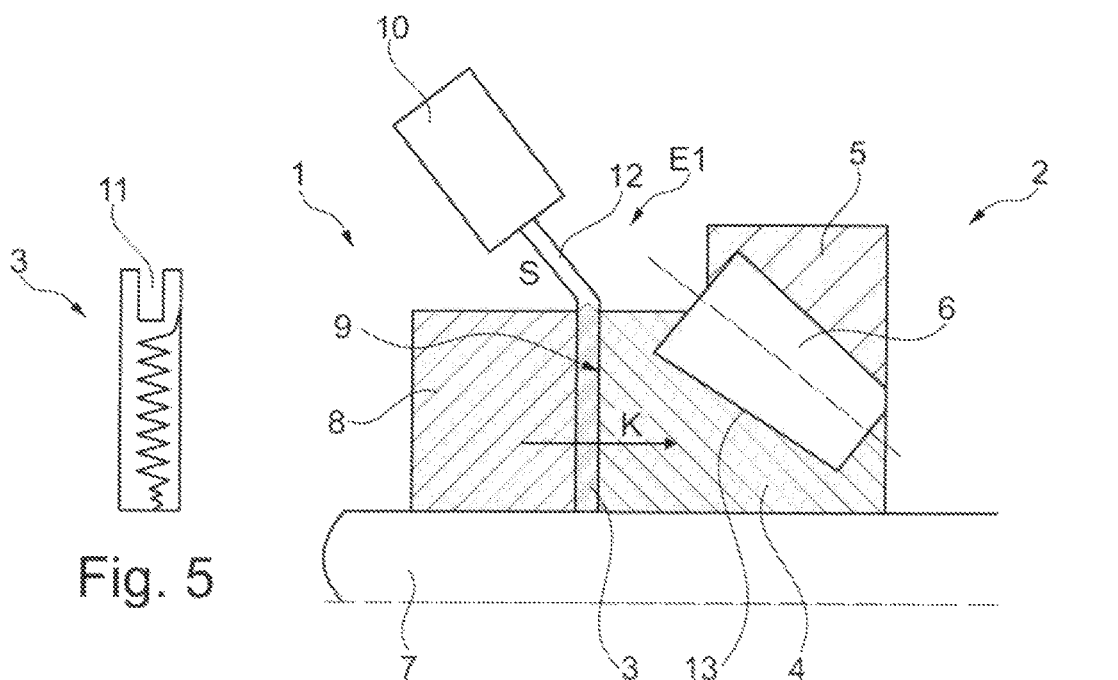
Fig. 5
Fig. 6

METHOD FOR MEASURING A PRELOADING FORCE AND BEARING ASSEMBLY FOR PERFORMING THE METHOD

BACKGROUND

The invention relates to a method for measuring at least one preloading force that acts between a shaft and a rolling-element bearing of a bearing assembly mounted on the shaft. The invention also relates to a bearing assembly for performing this method.

It is generally known to provide force measurement devices for operating a rolling-element bearing mounted on a shaft, in order to measure the forces acting on the rolling-element bearing.

For example, the laid-open patent application DE 4218949 A1, which forms the closest prior art, describes a force measurement bearing with a force measurement device. The force measurement device is a sensor element constructed as a force measurement film with a profile thickness between 0.02 and 0.7 millimeters. It can be inserted into arbitrarily constructed recesses on rolling-element bearings or in intermediate elements connected to rolling-element bearings or surrounding the entire bearing. The force measurement film can be used for detecting a static and also a dynamic force measurement in the axial and radial direction.

SUMMARY

The invention is based on the object of providing a method with which a rolling-element bearing can be mounted with a defined preloading force economically and correctly and reliably on a shaft. This objective is achieved by a method for measuring the preloading force and by a bearing assembly having one or more features of the invention. Preferred or advantageous embodiments of the invention are produced from the subordinate claims, the following description, and/or the accompanying figures.

A method for determining at least one preloading force is proposed that acts between a carrying body and a rolling-element bearing of a bearing assembly mounted on the carrying body. In particular, an axial preloading force is measured for and/or during the mounting of the rolling-element bearing on the carrying body directly or indirectly with the method. For example, the carrying body is constructed as a shaft or axle. The rolling-element bearing is preferably constructed as a conical roller bearing or ball bearing, in particular, as an angular contact ball bearing. Preferably, the rolling-element bearing has an inner ring, multiple rolling-element bodies, and an outer ring.

The bearing assembly comprises the rolling-element bearing and at least one sensor device. Optionally, the bearing assembly comprises at least one evaluation device.

The sensor device is arranged in an installation position in or on the rolling-element bearing and is coupled with the evaluation device by signals. In particular, the sensor device in the installation position can be connected to the evaluation device and detached from the evaluation device again. In this way, the sensor device preferably has a coupling interface and the evaluation device has a coupling counter interface.

The sensor device detects the preloading force during or after the mounting of the rolling-element bearing on the carrying body. As a function of the detected preloading force, the sensor device generates at least one signal and transmits this, in particular, via the coupling interface connected to the coupling counter interface, to the evaluation device.

The evaluation device evaluates the signal for measuring the preloading force. Optionally, the evaluation device outputs the value of the preloading force optically and/or acoustically.

The sensor device is permanently decoupled from the evaluation device after the evaluation of the signal. In particular, the coupling interface is separately permanently from the coupling counter interface.

Through the method according to the invention, a reliable, correct, and efficient measurement and setting of the preloading force can be realized in the mounting of the rolling-element bearing on the carrying body. It is especially advantageous that the method is suitable for series production. It is also advantageous that the rolling-element bearing can be driven together with the sensor device arranged in the installation position in the rolling-element bearing as a marketable unit.

In one preferred implementation of the method, the sensor device remains in the installation position after the transmission and/or evaluation of the signal. In particular, the sensor device is here decoupled from the evaluation device. Optionally, the sensor device and/or the coupling interface is destroyed during the decoupling of the evaluation device. Alternatively, in the scope of the invention it is possible that the sensor device is destroyed during the operation of the rolling-element bearing, for example, by forces acting on the sensor device in the installation position, in particular, by one or more rolling-element bodies of the rolling-element bearing.

An alternative, possibly preferred processing step provides that the sensor device is removed from the rolling-element bearing after the transmission and/or evaluation of the signal. In particular, the sensor device is located in a loose installation position, whereby it is detachable from this position without a tool. In particular, the sensor device is loosely placed, pushed in, or inserted into the installation position. For example, it is possible to remove the sensor device by rotating at least one of the rolling-element bodies of the rolling-element bearing from the installation position. It is preferred that the sensor device has a gripping aid that is constructed, for example, as a lug projecting from the sensor device. Preferably, the lug is accessible from outside of the installation position, so that this can be gripped and the sensor device can be pulled out from the installation position.

An optional embodiment in the scope of the method is to reuse the sensor device after the removal from the installation position for the mounting of at least one other rolling-element bearing on one shaft or the shaft. This has the advantage that costs can be spared for additional sensor devices.

In one preferred embodiment, the sensor device is constructed as a film, preferably as a measurement film, in particular, as a polyvinylidene fluoride film (PVDF film). It is also possible that the sensor device is constructed as a single-layer or multi-layer measuring strip or as a single-layer or multi-layer measuring plate. In this way, the sensor device is relatively thin and/or flexible and can be arranged in a simple way and without limiting the function on the rolling-element bearing in the installation position and optionally can remain permanently there. Alternatively, the sensor device can be formed as a measuring pin or measuring peg. This has the advantage that the sensor device can be arranged with an accurate fit and without limiting the function of the rolling-element bearing in at least one hole in the inner and/or outer ring of the rolling-element bearing and optionally can remain there permanently.

The sensor device constructed especially in at least one of the described embodiments as a piezoelectric, inductive, or photoelastic sensor. Alternatively, it is also possible that the sensor device is constructed as a hydraulic and/or chemical sensor.

For permanently leaving the sensor device in the installation position, it is preferably mounted in this position with a material-fit connection. In particular, the sensor device is bonded in the installation position. In this way, it cannot be removed from the installation position in a nondestructive way. In the case that the sensor device is permanently left in the installation position, it is formed, e.g., as a so-called lost sensor.

In one preferred structural implementation of the invention, the sensor device is arranged on the inner ring and/or on the outer ring of the rolling-element bearing. Here, the sensor device is arranged, in particular, on an axial surface and/or end face surface of the inner and/or outer ring. Alternatively or optionally additionally, the sensor device is arranged in a hole on the inner and/or outer ring. For the arrangement on the axial and/or end face surface, the sensor device is constructed, for example, with a circular ring shape. Thus, a uniform pressure distribution onto the sensor device can be guaranteed. For the arrangement of the sensor device in the hole of the inner and/or outer ring, this is preferably constructed as a measuring pin or measuring peg.

Alternatively or optionally additionally, the sensor device is arranged on a raceway of at least one of the rolling-element bodies. In particular, the sensor device is arranged between the raceway and at least one rolling-element body of the rolling-element bearing. Here, the sensor device is formed preferably as the film or as the measuring strip. Because the sensor device preferably has a very small thickness in this construction, it is especially suitable for the arrangement on the raceway. If the sensor device remains in the installation position after decoupling from the evaluation device and is not removed from this position, the sensor device is typically destroyed by the constant rolling of the rolling-element bearing or bearings, if this does not already happen due to the decoupling.

In the scope of the invention, the sensor device is also positioned between two rolling-element bearings, e.g., arranged in an X or O arrangement on the shaft and detects the preloading force there.

For the arrangement of the sensor device on the raceway of the rolling-element bearing as an angular contact ball bearing, the axial preloading force can be determined based on the running surface of the rolling-element body running at an angle relative to the carrying body. In the arrangement of the sensor device on the raceway of the rolling-element bearing as a conical roller bearing, the running surface of the conical rollers has a conical construction. Due to the angular construction of the running surface for the angular contact ball bearing or the conical running surface for the conical roller bearing, these rolling-element bearings receive the same radial and axial loads. In particular, the axial preloading force can be determined directly or indirectly by detecting and evaluating the axial load.

In one optional realization of the method, multiple sensor devices are arranged in multiple or also different installation layers in or on the rolling-element bearings. It is also possible that the multiple sensor devices differ in their construction and/or function. Through a location-resolved arrangement of the multiple sensor devices in the multiple installation positions, different measurement points can be provided. This can lead, in particular, to more reliable and more exact measurement results.

In one preferred embodiment of the invention, the coupling interface of the sensor device is arranged and/or constructed accessible from outside the installation position. In this way, the evaluation device can be coupled by means of the coupling counter interface in a simple way with the sensor device, in particular, in the scope of series production. For example, the coupling interface is constructed as a socket and the coupling counter interface is constructed as a connector. It is also possible that the coupling interface is constructed as a lug extending out from the installation position. For example, the corresponding coupling counter interface is constructed as a gripper and/or as a clip.

It is possible that the evaluation device can be decoupled from the sensor device without destroying this sensor device. In the scope of the invention it is also possible that the sensor device and/or the coupling interface is destroyed for the decoupling of the evaluation device from the sensor device. This is especially the case when the evaluation device is cut away, for example, from the sensor device.

Another object of the invention relates to a bearing assembly that is constructed, in particular, for performing the method according to the invention. The bearing assembly comprises the rolling-element bearing and the at least one sensor device. Optionally, the bearing assembly also comprises the evaluation device.

One preferred implementation of the bearing assembly provides that the sensor device is arranged on the raceway of at least one of the rolling-element bodies. Alternatively or optionally additionally the sensor device has a lug that is accessible from outside the installation position as the coupling interface and/or as the gripping aid.

Optionally, the rolling-element bearing has the sensor device that is destroyed and remains in the installation position after the mounting on the shaft that is performed with the measurement of the preloading force. This sensor device is optionally destroyed by the decoupling of the sensor device from the evaluation device. Alternatively, the sensor device is/was destroyed during the operation of the rolling-element bearing.

BRIEF DESCRIPTION OF THE DRAWINGS

Additional features, advantages, and effects of the invention are given from the following description of preferred embodiments of the invention. Shown herein are.

DETAILED DESCRIPTION OF THE PREFERRED EMBODIMENTS

Figure 1:
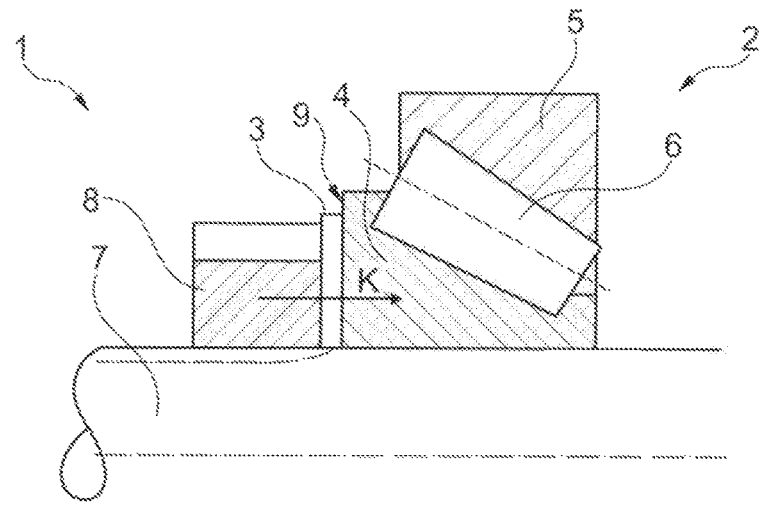
FIG. 1 a section view of a bearing assembly mounted on a shaft with a rolling-element bearing and with a sensor device arranged in a first installation position, FIG. 2 the bearing assembly from FIG. 1, wherein the sensor device is coupled in the first installation position with an evaluation device, FIG. 3 a plan view from the front on the bearing assembly from FIG. 2, FIG. 4 the bearing assembly from FIG. 2, wherein the sensor device is arranged in a second installation position, FIG. 5 an alternatively constructed sensor device, FIG. 6 the bearing assembly mounted on the shaft from FIG. 1 with the alternatively constructed sensor device from FIG. 5, FIG. 7 a flowchart for a method for determining the preloading force between a carrying body and a rolling-element bearing mounted on the carrying body.

FIG. 1 shows a section view of a bearing assembly 1 mounted on a carrying body 7. The carrying body 7 is constructed as a shaft. The bearing assembly 1 is mounted on the shaft 7 by a shaft nut 8 with a defined axial preloading force K.

The bearing assembly 1 comprises a rolling-element bearing 2 and a sensor device 3. The section line of the section view of FIG. 1 runs through a center point of the rolling-element bearing 2.

The rolling-element bearing 2 has an inner ring 4, an outer ring 5, and multiple rolling-element bodies 6. It is constructed as a conical roller bearing. Alternatively, the rolling-element bearing 2 can be constructed as a ball bearing, in particular, an angular contact ball bearing.

The sensor device 3 is arranged in a first installation position E1 in or on the rolling-element bearing 2. The first installation position E1 comprises the arrangement of the sensor device 3 on an end face and/or axial surface 9 of the inner ring 4. In particular, the sensor device 3 is arranged between the shaft nut 8 and the end face and/or axial surface 9 of the inner ring 4. Alternatively, the sensor device 3 can also be arranged on the end face and/or axial surface of the outer ring 5.

The sensor device 3 is constructed as a preferably thin measuring film that is formed, in particular, from a polyvinylidene fluoride (PVDF). Due to the small thickness of the film, this can be inserted in a simple way between the shaft nut 8 and the end face and/or axial surface 9 of the inner ring 4, without limiting the functionality of the rolling-element bearing 2.

The sensor device 3 is constructed as a piezoelectric sensor. It detects the axial preloading force K acting during the installation of the rolling-element bearing 2. The sensor device 3 generates, as a function of the detected axial preloading force K based on the piezoelectric effect, at least one electric signal S, in particular, a measurable voltage.

Figure 2:
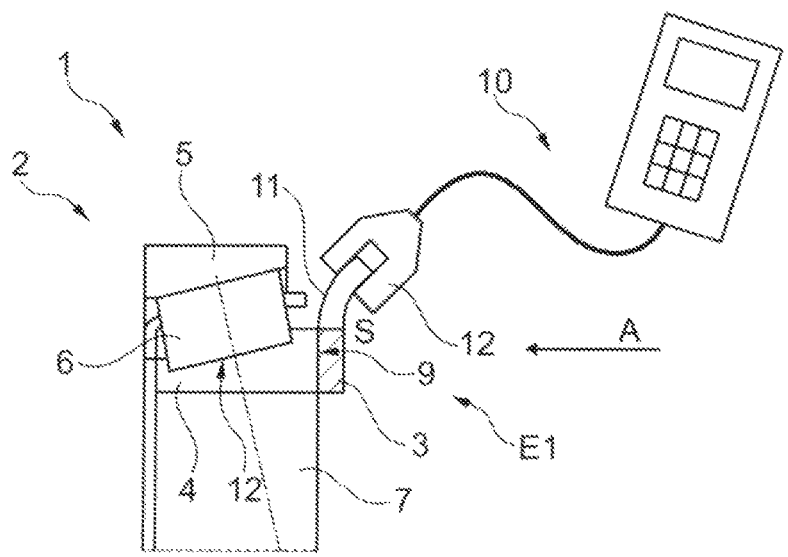

FIG. 2 shows the bearing assembly 1 from FIG. 1 with an evaluation device 10 coupled with the sensor device 3. Optionally, the bearing assembly 1 comprises the evaluation device 10.

The sensor device 3 is constructed as the film section and arranged in the first installation position E1 on the axial and/or end face surface 9 of the inner ring 4. The sensor device 3 has a coupling interface 11 that is accessible from outside the first installation position E1 and by means of which it is coupled with the evaluation device 10. The coupling interface 11 is constructed as a projecting lug.

The evaluation device 10 has a coupling counter interface 12 by means of which the evaluation device 10 is connected to the sensor device 3 before and/or during the mounting of the rolling-element bearing 2 on the shaft 7, so that an electrical connection is formed. The coupling counter interface 12 is constructed as a gripper that is connected via a cable or as a clip that is connected via a cable and engages the coupling interface 11, in particular, the lug.

In the coupled state, the sensor device 3 transmits the signal based on the preloading force K that is active during the installation to the evaluation device 10. This evaluates the signal S for measuring the preloading force K. The preloading force K is shown on a display of the evaluation device 10, so that the rolling-element bearing 2 can also be mounted on the shaft 7 quickly in series production and simply with a defined axial preloading force K.

Figure 3:
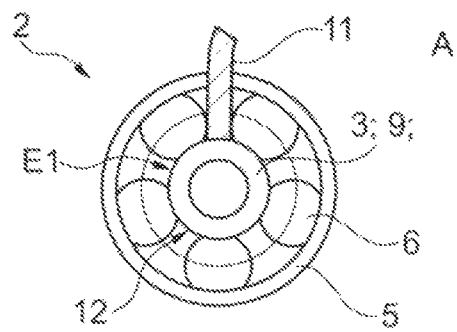

In FIG. 3, a plan view A is shown from the front of the rolling-element bearing 2 from FIG. 2, in particular, the axial and/or end face surface 9 of the inner ring 4. The sensor device 3 has a circular ring shape, wherein it is arranged in the first installation position E1 matching the axial and/or end face surface 9 of the inner ring 4. The sensor device 3 is attached with a material fit to the axial and/or end face surface 9, in particular, bonded to this surface. The coupling interface 11 constructed as a lug extends from the first installation position E1 past the outer ring 5 of the rolling-element bearing 2. The sensor device 3 is decoupled permanently from the evaluation device 10 after the measurement of the axial preloading force K (FIG. 1).

Due to the material-fit attachment, the sensor device 3 cannot be removed without damage and/or destruction from the first installation position E1. The sensor device 3 remains permanently in the first installation position E1 as shown after the decoupling of the evaluation device 10. In this case, the sensor device 3 is constructed as a lost sensor device 3. The lost sensor device 3 is destroyed by the decoupling or in the running operation of the rolling-element bearing 2. In particular, the bearing assembly 1 (FIG. 1) then has a no longer functioning sensor device 3.

Alternatively, the sensor device 3 is arranged loosely in the first installation position E1, so that it can be removed again after the mounting of the rolling-element bearing 2 with the measured preloading force K (FIG. 1) on the shaft 7 (FIG. 1) and after the decoupling of the evaluation device 10 from the first installation position E1. The coupling interface 11 constructed as a lug here functions as a gripping aid. After removal of the sensor device 3, this can be arranged in or on at least one other rolling-element bearing and thus can be reused for the mounting of the other rolling-element bearing for detecting the active axial preloading force K.

FIG. 4 shows the bearing assembly 1 with the sensor device 2 constructed as a film, wherein this is arranged in a second installation position E2 in or on the rolling-element bearing 2. In the second installation position E2, the sensor device 2 is arranged on a running surface 13 of at least one of the rolling-element bodies 6 of the rolling-element bearing 2.

The conical roller bearing 2 receives axial and radial loads due to the running surface 13 tapering toward the carrying body 7. From the axial load, the axial preloading force K can be determined directly or indirectly.

The sensor device 3 can be attached with a material fit onto the running surface 13 as already described for FIG. 3 and can be permanently decoupled from the evaluation device after the measurement of the axial preloading force K (FIG. 1) and after the mounting of the rolling-element bearing 2. Here, it can then remain in the second installation position.

Due to the rolling of the rolling-element body 6, the sensor device 3 is destroyed if this is not already performed by the decoupling of the evaluation device 10 (FIG. 2). Alternatively, the sensor device 3 can be set loosely on the running surface 13. Thus, it can be permanently decoupled from the evaluation device 10 after the measurement of the axial preloading force K (FIG. 1) and after mounting of the rolling-element bearing 2 and can be removed from the second installation position E2. Optionally, the sensor device 3 can be reused for the detection of the axial preloading force K acting during the mounting of at least one other rolling-element bearing.

FIG. 5 shows the sensor device 3 in an alternative construction, namely in the construction as a measuring strip. In this construction, the sensor device 3 is formed as a capacitive sensor for detecting the axial preloading force K (FIG. 6) and for generating the signal S. The measuring strip has a socket as a coupling interface 11. The coupling counter interface 12 of the evaluation device 10 (FIG. 6) constructed as a connector can be coupled with the socket.

FIG. 6 shows the sectional view of the bearing assembly 1 from FIG. 1, wherein the sensor device 3 is constructed as a measuring strip according to FIG. 5. The sensor device 3 is arranged as already described in FIGS. 1 and 2 in the first installation position E1 on the axial and/or end face surface of the inner ring 4. As already described before relative to FIGS. 3 and 4, the sensor device 3 can be decoupled permanently from the evaluation device 10 after mounting of the rolling-element bearing 2 with the defined axial preloading force K. Here, it can remain in the second installation position E2 after the decoupling or it can be removed from this position.

The sensor device 3 can also be alternatively constructed as a plate or pin. In the construction as a pin or peg, the sensor device is arranged in holes of the inner and/or outer ring 4; 5. Alternatively or optionally additionally, the sensor device 3 can be constructed as a chemical, hydraulic, and/or photoelastic sensor.

It is possible that the bearing assembly 1 has multiple sensor devices 3 that are arranged in the same or different installation positions E1; E2 in or on the rolling-element bearing 2. For example, the sensor devices 3 can be arranged with position resolution at different measurement points along the inner and/or outer ring 4; 5 and/or on the running surfaces 13 of multiple rolling-element bodies 6.

Figure 7:
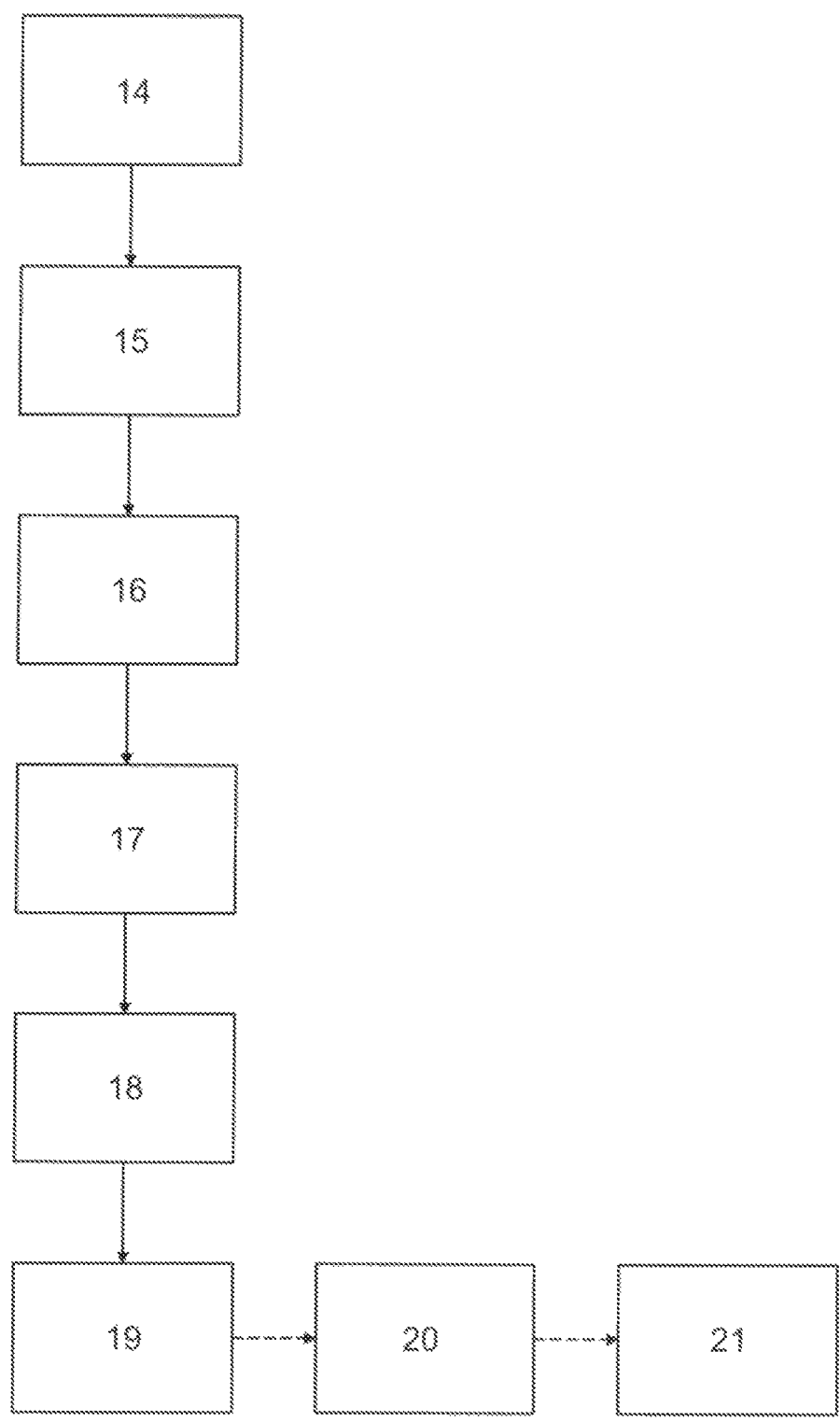

FIG. 7 shows a flowchart of a method for mounting the rolling-element bearing 2 of the bearing assembly 1 on the shaft 7 with a defined preloading force K. The method comprises the following steps:

14: The sensor device 2 is arranged in the installation position E1; E2 in or on the rolling-element bearing 2;

15: The sensor device 2 is coupled with an evaluation device 10 by signals;

16: The sensor device 3 detects the preloading force K and generates the at least one signal S as a function of the preloading force K;

17: The sensor device 3 transmits the signal S to the evaluation device 10;

18: The evaluation device 10 evaluates the signal S for measuring the preloading force K;

19: The sensor device 3 is permanently decoupled from the evaluation device 10 after the evaluation of the signal S;

20: Optionally additionally, the sensor device 3 remains permanently in the installation position E1; E2;

21: Optionally additionally, the sensor device 3 can be destroyed by the rolling-element bearing 2 in operation.

LIST OF REFERENCE NUMBERS

1 Bearing assembly
2 Rolling-element bearing
3 Sensor device
4 Inner ring
5 Outer ring
6 Rolling-element body
7 Shaft
8 Shaft nut
9 Axial and/or end face surface
10 Evaluation device
11 Coupling interface
12 Counter coupling interface
13 Running surface
14 First processing step
15 Second processing step
16 Third processing step
17 Fourth processing step
18 Fifth processing step
19 Sixth processing step
20 Seventh processing step
E1 First installation position
E2 Second installation position
K Axial preloading force
S Signal

The invention claimed is:

1. A method for determining a preloading force (K) acting between a carrying body and a rolling-element bearing of a bearing assembly mounted on the carrying body, the method comprising:
    providing the bearing assembly which comprises the rolling-element bearing and at least one sensor device,
    arranging the sensor device in an installation position (E1; E2) in or on the rolling-element bearing and coupling the sensor device with an evaluation device in a signal transmitting manner,
    the sensor device detecting the preloading force (K), generating at least one signal (S) as a function of the preloading force (K), and transmitting the signal (S) to the evaluation device,
    the evaluation device evaluating the signal (S) for measuring the preloading force (K),
    permanently decoupling the sensor device from the evaluation device after the evaluation of the signal (S).

2. The method according to claim 1, wherein the sensor device remains in the installation position (E1; E2) after the evaluation of the signal (S).

3. The method according to claim 1, further comprising removing the sensor device from the installation position (E1; E2) after the evaluation of the signal (S).

4. The method according to claim 1, wherein the sensor device is constructed as a film, as a measuring strip, as a plate, or as a pin.

5. The method according to claim 1, wherein the rolling-element bearing has an inner ring, multiple rolling-element bodies, and an outer ring, and the sensor device is arranged on at least one of the inner ring or on the outer ring.

6. The method according to claim 5, wherein the sensor device is arranged on a raceway of at least one of the rolling-element bodies.

7. The method according to claim 1, wherein the sensor device has a coupling interface accessible from outside the installation position (E1; E2) for coupling with the evaluation device.

8. The method according to claim 7, further comprising destroying at least one of the sensor device or the coupling interface for the decoupling of the evaluation device or during a running operation of the rolling-element bearing.

9. A bearing assembly for performing the method according to claim 1, wherein the bearing assembly comprises the rolling-element bearing and the at least one sensor device.

10. The bearing assembly according to claim 9, wherein the rolling-element bearing has an inner ring, multiple rolling-element bodies, and an outer ring, and the sensor device is arranged on a raceway of at least one of the rolling-element bodies.

11. The bearing assembly of claim 9, wherein the sensor device has a coupling interface that is accessible from outside the installation position (E1, E2).

\* \* \* \* \*